United States Patent

Chao

Patent Number: 5,592,243
Date of Patent: Jan. 7, 1997

[54] SPECTACLE FRAME HAVING GEAR COUPLING

[76] Inventor: Richard Chao, No. 43-4, Yi-Hsin Tsuen, Shui San Hsiang, Chia Yi Hsien, Taiwan

[21] Appl. No.: 555,003

[22] Filed: Nov. 9, 1995

[51] Int. Cl.⁶ .................. G02C 5/22; G02C 5/00
[52] U.S. Cl. ............... 351/153; 351/140; 16/228
[58] Field of Search ................... 351/120, 118, 351/119, 111, 153, 140, 41, 116, 121; 16/228

[56] References Cited

U.S. PATENT DOCUMENTS

| | | | |
|---|---|---|---|
| 3,064,530 | 11/1962 | Vigano | 351/121 |
| 3,422,449 | 1/1969 | Rinnman | 351/140 |
| 3,574,452 | 4/1971 | McLendon et al. | 351/153 |
| 3,582,192 | 6/1971 | Gitlin et al. | 351/52 |
| 3,907,410 | 9/1975 | Richmond et al. | 351/119 |
| 4,456,346 | 6/1984 | Beyer | 351/113 |
| 5,321,442 | 6/1994 | Albanese | 351/41 |
| 5,416,537 | 5/1995 | Sadler | 351/47 |

*Primary Examiner*—Hung Dang
*Attorney, Agent, or Firm*—Peterson, Wicks, Nemer & Kamrath, P.A.

[57] ABSTRACT

A spectacle frame includes two side portions each having an extension. The extensions each includes two gears rotatably secured in the end portions and engaged with each other. Two legs each has end secured to the outer gears of the extensions as to allow the legs to be rotated in concert with the outer gears. The extensions each includes a curved notch formed in the free end and the legs each includes a projection slidably engaged with the curved notches for limiting the rotational movement of the legs.

2 Claims, 2 Drawing Sheets

SPECTACLE FRAME HAVING GEAR COUPLING

BACKGROUND OF THE INVENTION

1. Field of the Invention

The present invention relates to frame, and more particularly to spectacle frame having two legs engaged with the frame body by gearing members.

2. Description of the Prior Art

Typical spectacle frames comprise a pair of legs pivotally coupled to the frame bodies by typical hinges or by spring action hinges for resiliently coupling the legs to the frame bodies.

The present invention has arisen to provide a novel spectacle frame.

SUMMARY OF THE INVENTION

The primary objective of the present invention is to provide a spectacle frame having two legs engaged with the frame body by gearing members.

In accordance with one aspect of the invention, there is provided a spectacle frame comprising a frame body for supporting lenses therein, the frame body including two side portions each having an extension extended therefrom, two pairs of first and second gears rotatably secured in the extensions respectively, the first gears being engaged with the second gears respectively, and a pair of legs each including a first end secured to the second gears as to allow the legs to be rotated in concert with the second gears.

The extensions each includes a free end having a curved notch formed therein, the second gears are rotatably engaged in the free ends of the extensions the first ends of the legs each includes a projection means extended therefrom for engaging with the curved notches and for limiting a rotational movement of the second gears and the legs.

The extensions each includes a pair of beams having a gap formed therebetween, the first and the second gears are rotatably engaged between the beams of the extensions.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
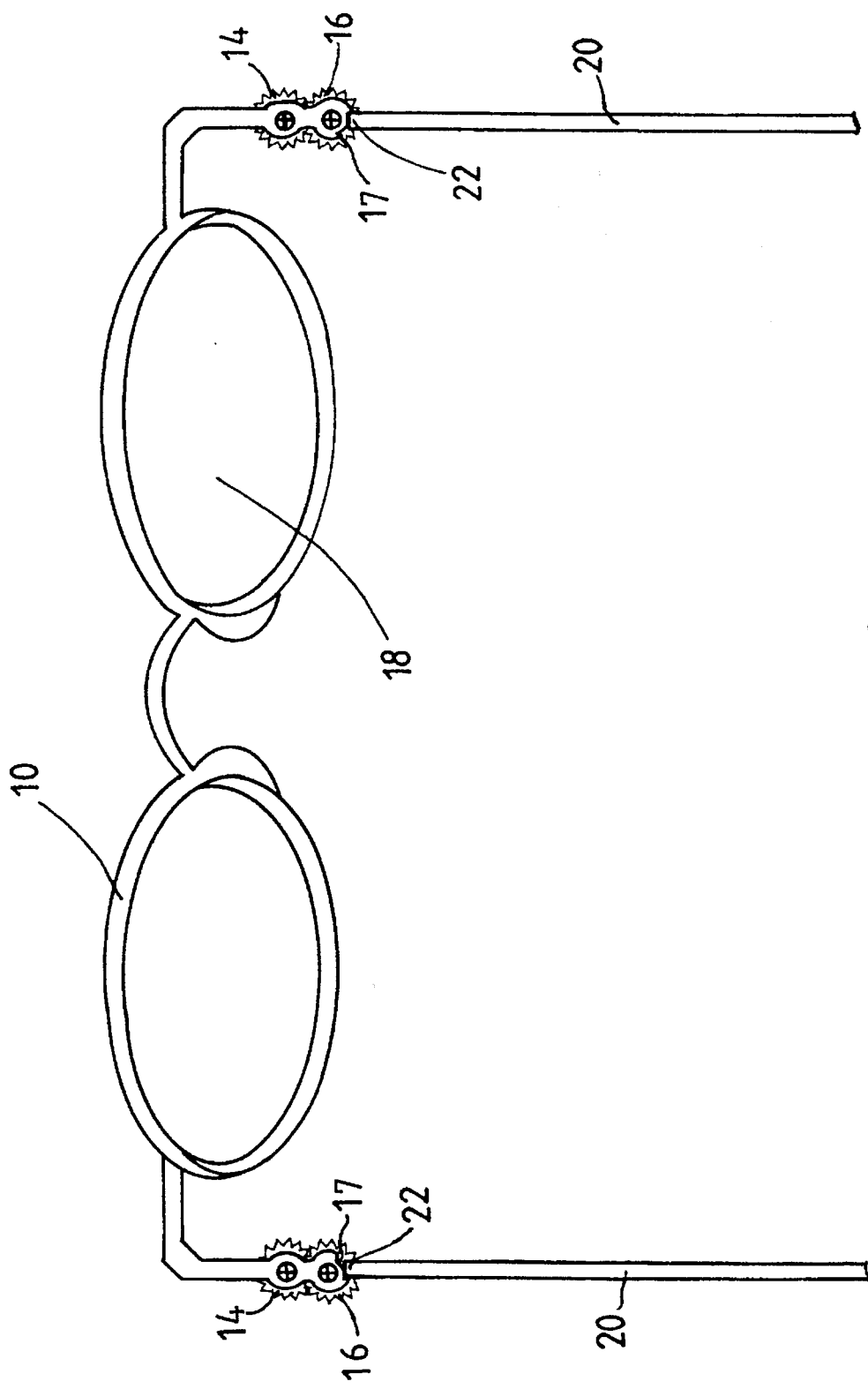
FIG. 1 is a perspective view of a spectacle frame in accordance with the present invention.
Figure 2:
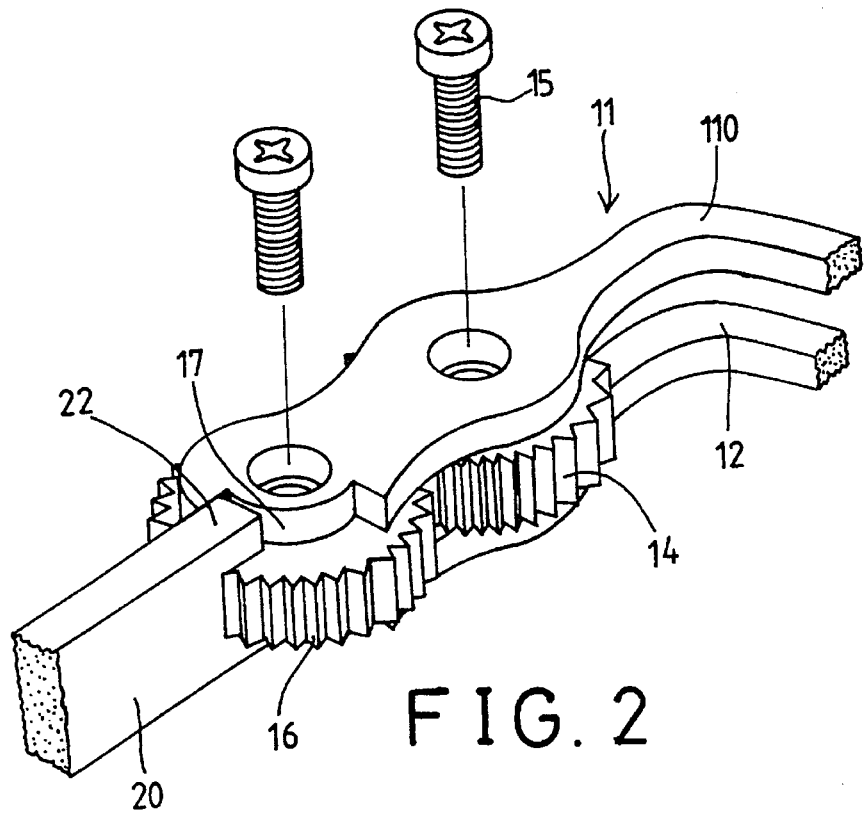
FIG. 2 is a partial exploded view illustrating the coupling of the legs to the spectacle frame.
Figure 3:
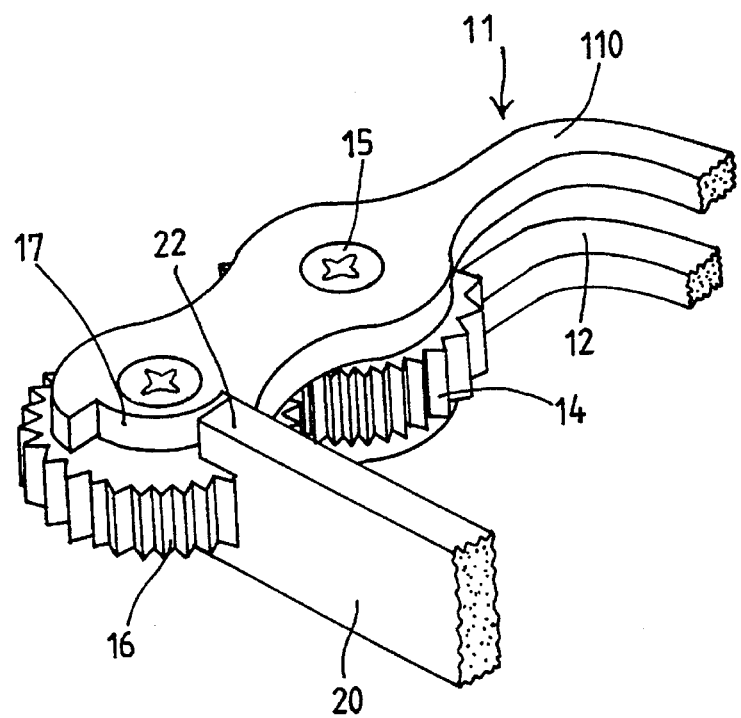
FIG. 3 is a partial perspective view of the coupling of the legs to the spectacle frame.

Referring to the drawings, a spectacle frame in accordance with the present invention comprises a frame body 10 for supporting lenses 18 therein. The frame body 10 includes two side portions each having an extension 11 extended therefrom. The extensions 11 each includes two beams 110 having a gap 12 formed therebetween and each includes two gears 4, 16 engaged between the beams 110 and pivotally secured between the beams 110 by fastening screws 15. The gears 14, 16 are engaged with each other. A pair of legs 20 each includes one end secured to the gears 16 such that the legs 20 may be rotated in concert with the gears 16.

The extensions 11 each includes a curved notch 17 formed in the end portion thereof. The legs 20 each includes a projection 22 slidably engaged in the curved notch 17 so as to limit the rotational movement of the legs 20 relative to the extensions 11.

Accordingly, the spectacle frame in accordance with the present invention includes a novel structure having two gears rotatably secured in the side extensions and engaged with each other. The legs are secured to outer gears.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A spectacle frame comprising:

a frame body for supporting lenses therein, said frame body including two side portions each having an extension extended therefrom, said extensions each including a first and a second gears rotatably secured therein, said first gears being engaged with said second gears respectively, said extensions each including a free end having a curved notch formed therein, said second gears being rotatably engaged in said free ends of said extensions, and a pair of legs each including a first end secured to said second gears as to allow said legs to be rotated in concert with said second gears, said first ends of said legs each including a projection means extended therefrom for engaging with said curved notches and for limiting a rotational movement of said second gears and said legs.

2. A spectacle frame according to claim 1, wherein said extensions each includes a pair of beams having a gap formed therebetween, said first and said second gears are rotatably engaged between said beams of said extensions.

* * * * *